United States Patent [19]
Okawa et al.

[11] Patent Number: 4,810,562
[45] Date of Patent: Mar. 7, 1989

[54] IMAGE CHANGEABLE SHEET WITH WATER

[75] Inventors: Takayuki Okawa, Fuji; Shigeaki Imai, Kiyose, both of Japan

[73] Assignee: Mishima Paper Co., Ltd., Japan

[21] Appl. No.: 43,405

[22] Filed: Apr. 28, 1987

[30] Foreign Application Priority Data

Dec. 16, 1986 [JP] Japan ................................ 61-297600

[51] Int. Cl.[4] ......................... B32B 23/08; B32B 27/10

[52] U.S. Cl. .................................... 428/199; 428/201; 428/207; 428/211; 428/341; 428/342

[58] Field of Search ............... 428/211, 199, 207, 201, 428/341, 342

[56] References Cited

U.S. PATENT DOCUMENTS 4,188,431 2/1980 Sokol et al. ..................... 428/199 X
4,188,437 2/1980 Rohowetz ........................... 428/199
4,399,177 8/1983 Ozasa ................................. 428/199

*Primary Examiner*—Thomas J. Herbert
*Attorney, Agent, or Firm*—Pollock, Vande Sande & Priddy

[57] ABSTRACT

An image changeable sheet with water characterized in that an opaque film comprising a transparent film and a water-absorbable coating layer formed on one side of the transparent film and containing a pigment composed mainly of a white pigment with a refractive index of not more than 1.7 is adhered to a base paper having an image on the colored surface, and a surface image is provided on the coating layer, said surface image being an image whose color matches the color of the colored surface and/or the image of the base paper seen through via water absorption.

14 Claims, 2 Drawing Sheets

IMAGE CHANGEABLE SHEET WITH WATER

TECHNICAL FIELD

This invention relates to an image changeable sheet with water, and more specifically to an image changeable sheet with water wherein when the sheet is wetted with water, an image on the surface of the sheet disappears and a different image appears, and when the sheet is dried, the original image revives.

BACKGROUND ART

There has been so far known an image changeable film with water which is an opaque film having a white or light-colored appearance and composed of a transparent film and a coating layer formed on one side of the transparent film, wherein when the film is adhered to any printed matter and the surface of the coating layer is wetted with water, the coating layer becomes transparent and the printed image rises to the surface vividly through the film (Japanese Laid-open Patent Application No. 199185/83).

The above image changeable film with water is white or light-colored throughout the surface, and no image is seen unless the film is wetted with water. Accordingly, said film has been a bit less amusing as a picture book or toy for children. Meanwhile, in recent years, a survival game that a target is shot at a fixed distance by a water pistol has appeared as an adult amusement. Ink is however used as a liquid being shot in this game or a printed matter easily broken when water strikes thereagainst is employed as a target, and there is thus a likelihood of making clothes dirty. Moreover, said film suffers problems with target designs and costs of materials.

SUMMARY OF THE INVENTION

An object of this invention is to resolve the aforesaid problems, that is, to provide an image changeable sheet with water that enables the image to appear with the aid of water, allows application of varying designs and makes possible the repetitive use said image changeable sheet with water being able to give different images to a person who observes it before or after water absorption in particular.

The present inventors have made studies at the request of Buddy L. Corporation (200 Fifth Ave., New York, N.Y. 10010, U.S.A.), and consequently found that in a sheet wherein an image changeable sheet with water having a surface image on a surface of a coating layer is adhered to a printed matter, the surface image comes out of the sight in harmony with a background color seen through via water absorption when there is a specific color difference between the surface image and the printed matter.

This invention is thus to provide an image changeable sheet with water characterized in that an opaque film comprising a transparent film and a water-absorbable coating layer formed on one side of the transparent film and containing a pigment composed mainly of a white pigment with a refractive index of not more than 1.7 is adhered to a base paper having an image on the colored surface, and a surface image is provided on the coating layer, said surface image being an image whose color matches the color of the colored surface and/or the image of the base paper seen through via water absorption.

BRIEF DESCRIPTION OF THE DRAWINGS

In the drawings attached hereto.

BEST AND VARIOUS MODES FOR CARRYING OUT INVENTION

Figure 1:
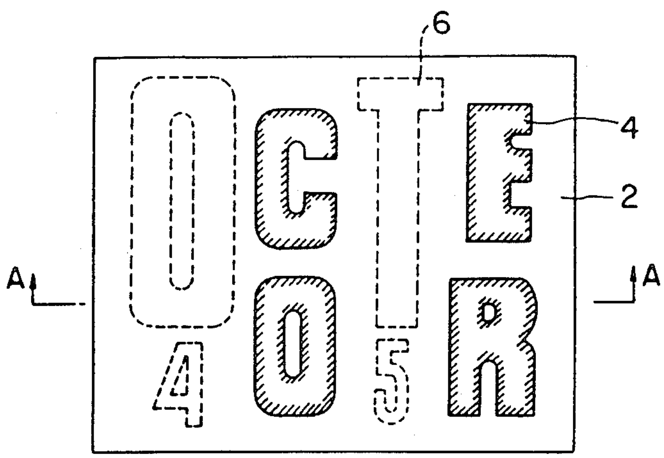
FIG. 1 is a plan view illustrating an example of an image changeable sheet with water in this invention.

The image changeable sheet with water in this invention is composed of an opaque film (hereinafter referred to as an "image changeable film with water") comprising a transparent film (1) and a water-absorbable coating layer (2) formed on one side of the transparent film (1) and containing a pigment composed mainly of a white pigment with a refractive index of not more than 1.7, a base paper (3), a colored surface (5) of the base paper, a surface image (4) and an image (6), i.e. an internal image on the colored surface.

The image changeable film with water shows a white or light-colored, highly opaque appearance, and the coating layer is quite easy to absorb water and clarified via water absorption. However, the coating layer is not delaminated even by water absorption, returned to the original appearance through evaporation of water, and does not allow occurrance of wrinkles or blurs even by repetitive water absorption and drying.

The image changeable film with water has to be prepared by using as a starting material a water-resistant transparent film or a transparent film with a water resistance imparted thereto. Examples thereof are polyethylene, polyvinyl chloride, polypropylene, polyesters, polyethylene terephthalate, polyvinyl alcohol, nylons, acetates, cellophane, etc. The higher clarity is better. The polypropylene film and the polyester film which are the most preferable films in this invention exhibit an opaqueness of not more than 5% measured by a Photovolt Reflector, Model 670.

The transparent film is required to have a surface tension of at least 35 dyne/cm, preferably at least 40 dyne/cm. This is because the image changeable film with water is used repetitively in relation to water, and this necessitates a surface tension (delamination resistance) in both dry and wet conditions. Many of general-purpose resin films do not have the lowest surface tension in this invention. Consequently, in order to complete the image changeable sheet with water, the surface treatment of the transparent film is advisable. It is necessary to raise the surface tension to a desirous value by e.g. conducting the corona discharge treatment or thinly coating a solution of a solvent such as polyvinyl alcohol, acetyl cellulose or isocyanates.

It goes without saying that the transparent film is colorless or light-colored with no pattern in view of the object of this invention.

The coating layer in the image changeable film with water has to contain a pigment composed mainly of a white pigment with a refractive index of not more than 1.7. Examples of such white pigment are synthetic silica, talc, white clay and calcium carbonate (said pigment is hereinafter referred to as a "white pigment with a low refractive index"). Titanium oxide and other materials having a higher refractive index are not desirous for achieving the object of this invention, but they may be used as an aid.

Binders are those having good affinity for films and providing transparency such as casein, starch, synthetic latexes and cellulose derivatives. Among others, acrylic latexes or SBR latexes are preferable.

The coating layer is formed by coating the above pigments or the other pigments such as carbon black which will be later described. A coating layer having a two-layered structure of upper and lower coating layers is more preferable in this invention. A difference in component between the upper and lower coating layers is that a small amount of a black or dark pigment, e.g. carbon black, is contained in the lower coating layer. The dark color includes, for example, purple, light brown and dark blue colors. A ratio of the other pigments is 1.3 to 1.7%, preferably about 1.5% based on the weight of the other solid contents (the white pigment with a low refractive index and the binder). These other pigments increase hiding properties. If the amounts thereof increase, a whiteness of the surface of the image changeable film with water decreases, and a clarity of the image appearing at the time of water absorption reduces. On the other hand, when the other pigments are not added at all, hiding properties are poor. Accordingly, the amounts of said other pigments may vary depending on the colored surface and the image of the base paper, etc. A mixing ratio of the white pigments with the low refractive index in both coating layers to the binder is set such that the surface strength of the image changeable film with water and the clarifying performance by water absorption can be best exhibited. That is, when the amount of the binder is smaller, the surface strength is lower. When the amount of the binder is larger, water absorption becomes difficult. Thus, the weight ratio of the white pigments with the low refractive index to the binder is 1:0.4–1.

The amount of the coating in the lower coating layer is 7 to 15 g/m$^2$, and that in the upper coating layer is 8 to 25 g/m$^2$. Where the total amount of the coatings in both layers is more than 40 g/m$^2$, an internal adhesion decreases, causing crack in the coating layer. Where it is less than 15 g/m$^2$, hiding properties notably decrease.

The base paper (3) has the colored surface (5) with the image ((6): hereinafter referred to as an "internal image"). Said base paper supports the image changeable film with water and causes a colored surface (*5b*) and a water image (*6b*) to appear via water absorption of the coating layer. Examples of the base paper are water-resistant thick papers, opaque synthetic resin sheets and synthetic papers. The synthetic papers are most preferable because said paper lack water absorption properties and permit beautiful printing with high luster through various printing means. The base paper is colored in advance by coating or printing, and it is also advisable that the colored surface is water-resistant and lacks water absorption properties. This holds true of the internal image formed on the colored surface.

The image on the surface of the coating layer, i.e. the surface image (4) matches the colored surface (5) or the internal image (6) via water absorption by [A] determining a given color difference between the surface image and the colored surface or the internal image and [B] using ink containing a white pigment with a refractive index of not more than 1.7 to form the surface image. These two means are described in detail below.

[A] Determination of the color difference

The coating layer is to have numerous fine pore channels thereon in view of the function. Besides, it is advisable in this invention to form the surface image such that water is absorbed from the surface image too, namely, the overall coating layer participates in water absorption. When a non-water-absorbable continuous coating is formed, waterdrops or a water film is further formed on the continuous coating in the water-absorbed state of the image changeable sheet with water, and the surface image becomes more vivid by reflection of light making it hard at times that the surface image matches the colored surface or the internal image of the base paper. In case the surface image is formed by usual printings, e.g. offset printing, a density of dots on a printing plate, an amount of ink, etc. can be so adjusted that water is immersed also from the image and the ink coated film does not cove the pore channels. On this occasion, if the same ink in the same amount as used in the colored surface or the internal image is employed in the printing of the surface image, the color of the surface image overlaps those of the colored surface or the internal image and becomes deep in the water-absorbed state. As a result, these colors do not match each other, making it impossible to achieve the object of this invention. Accordingly, when inks of colors of the same series are used in the surface image, the colored surface or the internal image in this invention, a specific color difference is required. As will be later described in EXPERIMENTAL EXAMPLE, the color difference has to be 40 to 60 DNS unit. When the color depth of the surface image gets higher and the color difference is less than 40, the colors are hard to match each other by water absorption. When the color depth of the surface image gets lower and the color difference is more than 60, the colors are easy to match each other but the surface image in the dry state becomes hard to be seen.

The aforesaid "colors of the same series" indicate a group of color names comprising a name of a basic color and modifiers, including an achromatic color as described in JIS Z 8102-1985. For instance, general names of 23 colors such as blue, greenish blue, purplish blue, etc. are shown in the series of the blue color. In this invention, it is advisable to use inks of colors with a given color difference selected from colors of the same series. Incidentally, in the field of the color science, there is a combination of colors which is generally poor in legibility, as is the case with arrangement of greenish blue letters on a black background. The colors of different basic color names are, if meeting the above requirement, included in the technical idea of this invention.

As the colored surface **5*b* and the water image 6*b*** are seen through via the transparent film and the clarified coating layer, it usually tends to look dull. The color of the base paper surface is therefore set to be preferably lighter than that of the surface image.

Figure 2:
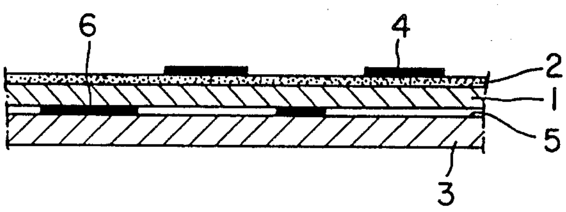
FIG. 2 is a sectional view taken along line A—A in FIG. 1.
Figure 3:
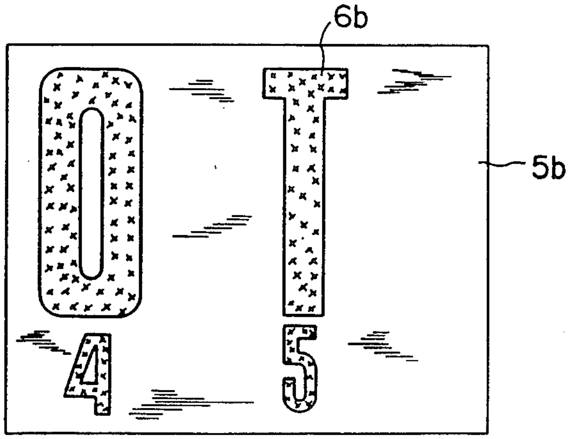
FIG. 3 is a plan view of said sheet in the water-absorbed state.

FIGS. 1 to 3 are examples wherein the surface image is formed by specifying the color difference as above. For the sake of explanation, an embodiment wherein the color of the surface image matches the color of the colored surface is shown in these figures. It is also possible to provide an embodiment wherein the color of the surface image matches the color of the internal image or an embodiment wherein the color of the surface image matches the colors of both the colored surface and the internal images. All commercial inks to form a water-resistant coating are available as ink of the surface image. A printing method is not limited in particular, but offset printing, gravure printing and screen printing are most preferable because a water-absorbable ink coating can easily be formed by selecting dots and mesh of a printing plate.

[B] Specifying of blending inks

Figure 4:
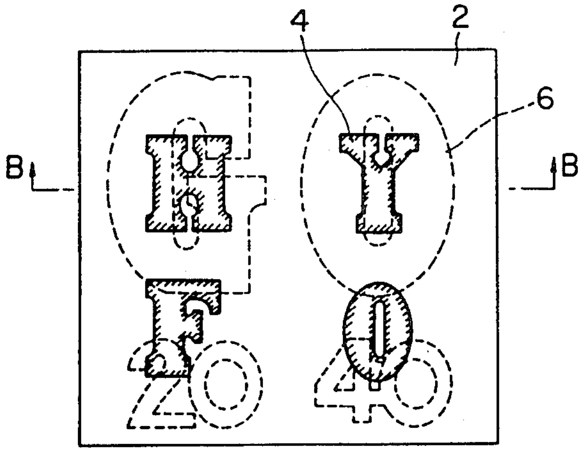
FIG. 4 is a plan view illustrating another example of the image changeable sheet with water in this invention.
Figure 5:
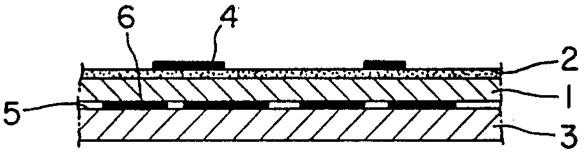
FIG. 5 is a sectional view taken along line B—B in FIG. 4.
Figure 6:
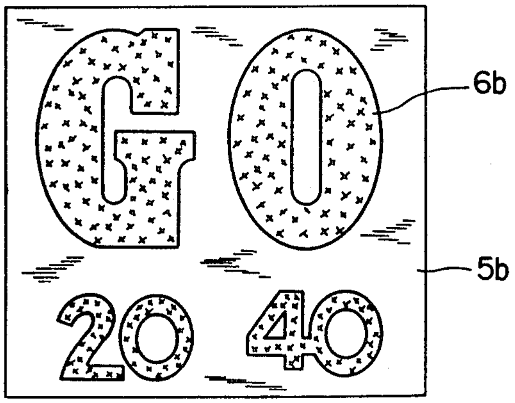
FIG. 6 is a plan view of said sheet in the water-absorbed state.

A surface image printed by using as ink for surface refractive image, instead of an ordinary ink using a pigment with a high refractive index as a main pigment, an aqueous ink comprising the aforesaid white pigment with the low refractive index as a main pigment, the same binder as described in the aforesaid coating layer and a suitable amount of a color pigment, or a so-called oil ink to solidify a white pigment with a low refractive index and a color pigment by drying a known vehicle such as a linseed oil vehicle is clarified by water absorption and almost loses a color sense. The color pigment can be used in an amount of 3 to 10% by weight based on the solids content of ink. In this case, the surface image can be formed without being restricted by the colors of the colored surface and the internal image. More preferable is to select the colors having the above color difference. FIGS. 4 to 6 are examples wherein the surface image is formed by specifying the blending of ink as above, and show an embodiment that the surface image overlaps the colored surface and the internal image.

The preferable embodiments of this invention have been thus far explained. However, this invention is not limited to these embodiments, and it is optionally possible to form two or more surface images different in rate of water absorption on the coating layer or to conjointly use a water-absorbable surface image and a non-water-absorbable surface image.

The range of the color difference by which the color of the surface image effectively matches the color of the colored surface at the point of water absorption can be seen as in EXPERIMENTAL EXAMPLE below.

EXPERIMENTAL EXAMPLE

A single side cast coated paper (Esprit Coat®: a product of Sanyo-Kokusaku Pulp Co., Ltd.) having a basis weight of 127 g/m$^2$ was used as a base paper, and the surface thereof was uniformly printed with black and red printing inks (No. 2 synthetic paper oil inks of Toka Shikiso Kagaku Kogyo K. K.) each in an amount of about 2.5 g/m$^2$. A 25-micron thick polyester film was used as a transparent film. A coating layer having a two-layered structure was formed using a coating shown in Table 1, and an image changeable sheet with water was thus formed. Parts referred to in Table 1 are all parts by weight.

TABLE 1

| Composition of a coating | Lower coating layer (parts) | Upper coating layer (parts) |
|---|---|---|
| Water | 67.65 | 65.0 |
| Sodium hexa-methaphosphate | 0.14 | 0.16 |
| Kaolin | 7.92 | 8.70 |
| Synthetic silica | 11.10 | 13.94 |
| Acrylic ester copolymer latex | 12.67 | 12.20 |
| Carbon black* | 0.52 | — |
| Dry weight of coating (g/m$^2$) | 10 | 15 |

*Mikuni SM Black C: a product of Mikuni Shikiso K. K.

For convenience' sake, the same inks as used in the base paper were imployed in printing the surface image, and a letter indicated at (4) in FIG. 1 was printed with said inks by offset printing. Several types of surface images were formed with varying amounts of inks adhered. The resulting samples were tested for color difference in the following manner.

A digital color difference meter (SM-3 Model: a device of Suga Shikenki K. K.) according to JIS Z 8722 was used as a measuring device. A color difference ΔE (delta-E) was a color difference ΔE (NBS units: National Bureau of Standard unit) by a Lab system among color differences shown in JIS Z 8730. ΔE is calculated from Δa and Δb according to a Hunter color difference formula. L is a brightness, "ab" is a chromaticity showing a hue and a chroma. "a" and "b" are each a direction of a color. The order and the results of measurement are as follows.

The samples were equilibrated in a room of 20° C. and RH of 65%. Subsequently, colors of the samples were tested and a color difference ΔE was measured. After the image changeable film with water was adhered to the base paper, water was absorbed in the surface of the coating layer, and a color difference ΔE between the surface image and the colored surface seen through was measured. Meanwhile, the samples before and after water absorption were observed with an unaided eye at a distance of 2.5 m. The samples were selected which were legible in the dry state but actually illegible in the water-absorbed state. The results are shown in Tables 2 and 3.

TABLE 2

| (black) | | L | a | b | ΔE |
|---|---|---|---|---|---|
| Dry state | Colored surface | 8.37 | −0.56 | −1.16 | — |
| | Surface image | 49.68 | −0.83 | −2.12 | 41.32 |
| Water-absorbed state | Colored surface | 27.89 | −3.31 | −4.07 | — |
| | Surface image | 23.04 | −2.42 | −2.19 | 5.28 |

L . . . brightness
a . . . direction of green
b . . . direction of blue

TABLE 3

| (red) | | L | a | b | ΔE |
|---|---|---|---|---|---|
| Dry state | Colored surface | 29.23 | 59.42 | 17.99 | — |
| | Surface image | 56.18 | 15.62 | −3.00 | 55.54 |
| Water-absorbed state | Colored surface | 33.58 | 16.47 | 1.96 | — |
| | Surface image | 31.21 | 21.42 | 2.52 | 5.53 |

L . . . brightness
a . . . direction of red
b(+) . . . direction of yellow
b(−) . . . direction of blue In e.g. Table 3 (red), the color difference in the dry state was 55.54. There is a color difference of 5.53 in the water-absorbed state. With such color difference, the color cannot actually be discriminated at a distance of 2.5 m. This holds true of the other colors. In the image changeable sheet with water in this invention, the color of the colored surface on the base paper is usually lighter than the color of the surface image. Accordingly, the color difference in the usual case tends to be big compared to the results of this test using the same inks. Considering this point, the color difference required for the image changeable sheet with water in this invention can be 40 to 60 DNS unit.

The following Examples illustrate this invention in more detail. Parts are on the weight basis.

EXAMPLE 1

A lower coating solution with a surface tension of 35 dyne/cm having the coating composition shown in Table 1 was coated (dry weight 10 g/m$^2$) with a Mayer bar on a substrate whose surface tension was made 45 dyne/cm by previously subjecting a 30 micron-thick polypropylene film to corona discharge, and dried with hot air of 100° C. An upper coating solution (Table 1) having almost the same surface tension as the lower coating solution was coated (dry weight 15 g/m$^2$) thereon with a Mayer bar, and dried with hot air of 100° C. There was formed an image changeable film with water. A greenish blue surface image was printed on the surface of the coating layer by offset printing. No. 2 synthetic paper ink made by Toka Shikiso Kagaku Kogyo K. K. was used for said surface image. When the image surface was observed with a 10X magnifier, dots of the printing plate were seen on the overall surface. A synthetic paper (Yupo ®: a product of Oji Yuka Synthetic Paper Co., Ltd.) wherein an orange internal image was formed on an art ultramarine base was used as a base paper. A color difference between the surface image and the colored surface of the base paper was measured by a color difference meter, SM-3 Model of Suga Shikenki K. K. The results are shown in Table 4. These were adhered by an acrylic adhesive. The structure is as shown in FIGS. 1 and 2.

TABLE 4

| (blue) | | L | a | b | ΔE |
|---|---|---|---|---|---|
| Dry state | Colored surface | 23.96 | −4.07 | −56.44 | — |
| | Surface image | 43.99 | −2.42 | −11.51 | 49.51 |
| Water-absorbed state | Colored surface | 25.89 | 0.39 | −11.33 | — |
| | Surface image | 21.48 | −1.38 | −11.75 | 4.77 |

L . . . brightness
a(−) . . . direction of green
a(+) . . . direction of red
b . . . direction of blue As shown in Table 4, the color difference between the colored surface of the base paper and the surface image was 49.51. The colored surface and the internal image were actually concealed in the resulting image changeable sheet with water in this invention. As soon as the sheet was wetted with water, the surface image matched the colored surface and almost disappeard, and the vivid internal image appeared with the colored surface, as shown in FIG. 3. The value 4.77 in column ΔE of Table 4 means that a slight color difference could be measured between the surface image and the colored surface in the water-absorbed state.

The product was cut to a given size and used in a distance of a few meters as a target of a survival game, but the performance thereof was not decreased even by the repetitive use.

EXAMPLE 2

An image changeable film with water was formed using a 50 micron-thick hard vinyl chloride film (surface tension 40 dyne/cm) having an untreated surface and the same coating solution as in Example 1. A surface image was printed by flexographic printing with ink obtained by adding a yellowish green pigment (Hansa yellow . . . an azo pigment) to the coating of the same composition as in the coating solution described in Example 1. A weight ratio of the yellowish green pigment to the ink solids content was 4.33%. A synthetic paper (Yupo ® a product of Oji Yuka Synthetic Paper Co., Ltd.) was used as a base paper. The characteristics of both the images and the colored surface are shown in Table 5.

TABLE 5

| | | L | a | b |
|---|---|---|---|---|
| Dry state | Colored surface (yellowish green) | 52.60 | −6.38 | 31.39 |
| | Internal image (redish yellow) | 35.31 | 39.68 | 15.13 |
| | Surface image (yellowish green) | 43.42 | −2.07 | 15.05 |

L . . . brightness
a(−) . . . direction of green
a(+) . . . direction of red
b . . . direction of yellow These were adhered with an acrylic adhesive. The structure is as shown in FIGS. 4 and 5. The colored surface an the internal image were actually concealed, and when the sheet was wetted with water, the surface image was clarified and came out of the sight, and the vivid internal image appeared with the colored image (FIG. 6).

A tack sheet was formed by applying a rubber tackifier and a release paper to the opposite side of the image changeable sheet with water. A product obtained by delaminating the release paper from the tack sheet could be used as a target of a survival game as in Example 1.

As is understandable from the foregoing explanation, the image changeable sheet with water in this invention allows the phenomena, disappearance of the surface image and appearance of the water image either simultaneously or successively. This brings forth an effect that the surface image is changeable with water, and said sheet finds various applications for not only children but also adults, accordingly.

What we claim is:

1. An image changeable sheet with water characterized in that an opaque film comprising a transparent film and a water-absorbable coating layer formed on one side of the transparent film and containing a binder and a pigment composed mainly of a white pigment with a refractive index of not more than 1.7 is adhered to a substrate having an image on a colored surface of the substrate intermediate to the transparent film and the substrate, and a surface image is provided on the water-adsorbable coating layer, said surface image being an image whose color matches the color of the colored surface and/or the image of the substrate seen through via water absorption and wherein said transparent film is located intermediate said water-absorbable coating layer and said substrate.

2. An image changeable sheet with water of claim 1 wherein the surface image is water-absorbable.

3. An image changeable sheet with water of claim 1 wherein a color difference between the colored surface and/or the image of hte substrate and the surface image is 40 to 60 DNS unit in the dry state.

4. The image changeable sheet of claim 1 wherein said transparent film has a surface tension of at least 35 dyne/cm.

5. The image changeable sheet of claim 1 wherein said transparent film has a surface tension of at least 40 dyne/cm.

6. The image changeable sheet of claim 1 wherein white pigment is selected from the group of synthetic silica, talc, white clay, and calcium carbonate.

7. The image changeable sheet of claim 1 wherein said wtaer-absorbable coating layer contains said white pigment and a binder in a weight ratio of 1:4.4–1.

8. The image changeable sheet of claim 1 wherein said substrate comprises a synthetic paper.

9. The iamge changeable sheet of claim 1 wherein said substrate compeises opaque synthetic resin sheet.

10. The image changeable sheet of claim 1 wherein said transparent film includes a polymer selected from the group of polypropylene and polyester.

11. The image changeable sheet of claim 1 wherein said pigment includes 1.3 to 1.7% by weight of a dark pigment based upon the weight of the white pigment and binder in said water-absorbable coating layer.

12. The image changeable sheet of claim 11 wherein said dark pigment is carbon black.

13. The image changeable sheet of claim 1 wherein said water absorbable coating layer is a two-layered structure of an upper coating layer and a lower coating layer.

14. The image changeable sheet of claim 13 wherein the amount ofsaid lower coating layer is 7 to 15 $g/m^2$ and the amount of said upper coating layer is 8 to 25 $g/m^2$.

* * * * *